United States Patent
Odibat et al.

(10) Patent No.: US 11,748,621 B2
(45) Date of Patent: *Sep. 5, 2023

(54) METHODS AND APPARATUS FOR FEATURE GENERATION USING IMPROVED TERM FREQUENCY-INVERSE DOCUMENT FREQUENCY (TF-IDF) WITH DEEP LEARNING FOR ACCURATE CLOUD ASSET TAGGING

(71) Applicant: Kyndryl, Inc., New York, NY (US)

(72) Inventors: Omar Odibat, Cedar Park, TX (US); Jean Xu Yu, Austin, TX (US); Emrah Zarifoglu, San Mateo, CA (US); Ilyas Mohamed Iyoob, Pflugerville, TX (US)

(73) Assignee: Kyndryl, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,976

(22) Filed: Nov. 8, 2022

(65) Prior Publication Data

US 2023/0076569 A1 Mar. 9, 2023

Related U.S. Application Data

(63) Continuation of application No. 16/785,191, filed on Feb. 7, 2020, now Pat. No. 11,526,754.

(51) Int. Cl.
*G06N 3/08* (2023.01)
*H04L 67/141* (2022.01)
(Continued)

(52) U.S. Cl.
CPC ............. *G06N 3/08* (2013.01); *G06F 16/906* (2019.01); *G06F 16/908* (2019.01); *G06N 3/045* (2023.01); *H04L 67/10* (2013.01); *H04L 67/141* (2013.01)

(58) Field of Classification Search
CPC ..... G06F 16/906; G06F 16/908; H04L 67/10; H04L 67/141; G06N 3/08
(Continued)

(56) References Cited

U.S. PATENT DOCUMENTS 10,979,315 B1 4/2021 Buxton et al.
2018/0324198 A1 11/2018 Borthakur et al.
(Continued)

FOREIGN PATENT DOCUMENTS

CN 102930063 B 6/2015
CN 104346459 B 10/2017
(Continued)

OTHER PUBLICATIONS

Mathworks, Extract Image Features Using Pretrained Network, 2020, https://www.mathworks.com/help/deeplearning/examples/extract-image-features-using-pretrained-network.html.
(Continued)

*Primary Examiner* — James E Springer
(74) *Attorney, Agent, or Firm* — Erik Swanson; Andrew M. Calderon; Calderon Safran & Cole, P.C.

(57) ABSTRACT

An embodiment includes generating an input document that includes a plurality of text fields of attribute data. The embodiment also includes extracting a set of candidate features from the attribute data using a feature extraction module that evaluates the attribute data using first and second machine learning models, where the first machine learning model scores terms in the input document and the second machine learning model includes a deep learning model. The embodiment also includes calculating feature-selection values for respective features of the set of candidate features and generating tag information for a remote
(Continued)

computing asset using a machine learning classifier that predicts the tag information based on the feature-selection values.

20 Claims, 6 Drawing Sheets

(51) Int. Cl.
    *H04L 67/10*     (2022.01)
    *G06F 16/906*     (2019.01)
    *G06F 16/908*     (2019.01)
    *G06N 3/045*     (2023.01)

(58) Field of Classification Search
    USPC .......................................................... 706/20
    See application file for complete search history.

(56) References Cited

U.S. PATENT DOCUMENTS

2020/0127892 A1     4/2020   Savelle et al.
2020/0250530 A1     4/2020   Shen

FOREIGN PATENT DOCUMENTS

| CN | 108491429 A | 9/2018 |
| CN | 105893388 B | 8/2019 |
| CN | 106611057 B | 8/2019 |

OTHER PUBLICATIONS

Chandra, Feature Selection in Text Classification, Towards Data Science, Nov. 5, 2018, https://towardsdatascience.com/featu re-selection-on-text-classification-1 b868 79f548e.

Schaetti, UniNE at CLEF 2017: TF-IDF and Deep-Learning for Author Profiling, Notebook for PAN at CLEF 2017, http:/ /ceur-ws.org/Vol-1866/paper_ 80.pdf.

List of IBM Patents or Patent Applications Treated as Related, dated Nov. 7, 2022, 1 page.

*FIGURE 5*

| FEATURE<br><br>DL FEATURES START WITH PREFIX PROB<br>TF – IDF FEATURES START WITH PREFIX TFIDF<br><br>502 | ORIGINAL<br>IV<br><br>504 | WITH PENALTY (P) ON DEEP LEARNING FEATURES IV*(1-P).<br>TOP 3 ARE HIGHLIGHTED. | | | | |
|---|---|---|---|---|---|---|
| | | P = 0<br>506 | P = 0.2<br>508 | P = 0.4<br>510 | P = 0.8<br>512 | P = 1<br>514 |
| PROB_BUDGETARYUNIT_PROD | 0.5 | 0.5 | 0.4 | 0.3 | 0.1 | 0 |
| PROB_BUDGETARYUNIT_QA | 0.48 | 0.48 | 0.384 | 0.288 | 0.096 | 0 |
| TFIDF_ASSETNAME_DEV | 0.45 | 0.45 | 0.45 | 0.45 | 0.45 | 0.45 |
| PROB_ASSETNAME_DEV | 0.4 | 0.4 | 0.32 | 0.24 | 0.08 | 0 |
| TFIDF_ASSETNAME_QA | 0.35 | 0.35 | 0.35 | 0.35 | 0.35 | 0.35 |
| TFIDF_BUDGETARYUNIT_DEV | 0.3 | 0.3 | 0.3 | 0.3 | 0.3 | 0.3 |

METHODS AND APPARATUS FOR FEATURE GENERATION USING IMPROVED TERM FREQUENCY-INVERSE DOCUMENT FREQUENCY (TF-IDF) WITH DEEP LEARNING FOR ACCURATE CLOUD ASSET TAGGING

TECHNICAL FIELD

The present invention relates generally to a method, system, and computer program product for asset management. More particularly, the present invention relates to a method, system, and computer program product for feature generation for asset classification.

BACKGROUND

Cloud computing refers to the practice of using a network of remote servers hosted on a public network (e.g., the Internet) to deliver computing services (i.e., cloud computing services) as opposed to doing so on a local information server. The network architecture (e.g., virtualized information processing environment comprising hardware and software) through which these cloud computing services are provided to service consumers (i.e., a cloud computing service consumers) is referred to as "the cloud", which includes cloud computing services provided to cloud computing service consumers, networks or data centers that supply cloud computing services to only a specified group of cloud computing service consumers, and cloud computing services provided to a limited set of cloud computing service consumers, e.g., to agencies with a specific State/Region or set of States/Regions, as well as dedicated/hosted clouds and other emerging cloud computing service delivery models. The underlying intent of cloud computing is to provide easy, scalable access to computing resources and information technology (IT) services to cloud computing service consumers.

Cloud computing services can be broadly divided into four categories: Infrastructure-as-a-Service (IaaS), Platform-as-a-Service (PaaS), Software-as-a-Service (SaaS), and Managed Services. Infrastructure-as-a-Service refers to a virtualized computing infrastructure through which cloud computing services are provided (e.g., virtual server space, network connections, bandwidth, IP addresses, load balancers, etc.). Platform-as-a-Service in the cloud refers to a set of software and product development tools hosted on the cloud for enabling developers (i.e., a type of cloud service consumer) to build applications and services using the cloud. Software-as-a-Service refers to applications that are hosted on and available on-demand by cloud service consumers via the cloud. Managed Services refers to services such as backup administration, remote system administration, application management, security services, etc. that are enabled by managed service providers for any Cloud computing services.

In general, a cloud computing service has three distinct characteristics that differentiate it from a traditionally hosted service. The first one of these distinct characteristics is that it is sold to a services consumer on demand (e.g., by the minute or the hour). The second one of these distinct characteristics is that it is dynamic (e.g., a services consumer can have as much or as little of a service as they want at any given point in time). The third one of these distinct characteristics is that the service is fully managed by a cloud computing services provider (e.g., the services consumer only needs a suitably equipped client device and network connection).

Cloud computing services are rapidly being adopted by business and IT users to make their organizations more effective and to save costs. Along with this opportunity comes a new set of pain points and significant risks to enterprises that must be addressed. For example, business users are rapidly investing in their own cloud capabilities (e.g., IaaS, PaaS, and SaaS) to meet business needs while application developers want to move rapidly without the involvement of IT to provision tools and environments. These actions are creating a significant threat to IT management who are worried about considerations such as, for example, managing costs, chargeback, capacity and resources from the result of unrestrained/unplanned cloud expansion.

For many companies, effective cost management preferably includes accurate asset classification to cut costs and maintain regulatory compliance. For example, as the demand for cloud computing continues to increase, the importance of classifying cloud computing assets will likewise increase, for example to allow pricing and allocation comparisons across multiple providers or plans. Furthermore, to provide complete visibility into all of a company's assets, some companies categorize cloud computing assets in multiple categories.

SUMMARY

The illustrative embodiments provide for feature generation for asset classification. An embodiment includes generating an input document that includes a plurality of text fields of attribute data associated with a group of cloud computing assets having a specified label for a specified class. The embodiment also includes extracting a set of candidate features from the attribute data using a feature extraction module that evaluates the attribute data using first and second machine learning models, wherein the first machine learning model scores terms in the input document and outputs a first portion of the set of candidate features ranked according to the term scores, and wherein the second machine learning model includes a deep learning model and outputs a second portion of the set of candidate features ranked according to term probabilities. The embodiment also includes calculating feature-selection values for respective features of the set of candidate features, wherein the calculating includes normalizing the term scores and ranking the set of candidate features based on a feature-selection algorithm. The embodiment also includes generating tag information for a remote computing asset using a machine learning classifier that predicts the tag information based on the feature-selection values. Other embodiments of this aspect include corresponding computer systems, apparatus, and computer programs recorded on one or more computer storage devices, each configured to perform the actions of the embodiment.

Another embodiment includes generating an input document that includes a plurality of text fields of attribute data associated with a group of cloud computing assets having a specified label for a specified class. The embodiment also includes extracting a set of candidate features from the attribute data using a feature extraction module that evaluates the attribute data using first and second machine learning models that output respective first and second portions of the set of candidate features having respective candidate feature values. The embodiment also includes receiving a user input indicative of a user preference for prioritizing explainability over accuracy. The embodiment also includes calculating feature-selection values for respective features of the set of candidate features, wherein the calculating includes normalizing the candidate feature values and penalizing candidate feature values of candidate features from the second machine learning model based on the user input. The embodiment also includes generating tag information for a remote computing asset using a machine learning classifier that predicts the tag information based on the feature-selection values. Other embodiments of this aspect include corresponding computer systems, apparatus, and computer programs recorded on one or more computer storage devices, each configured to perform the actions of the embodiment.

Another embodiment includes generating an input document that includes a plurality of text fields of attribute data associated with a group of cloud computing assets having a specified label for a specified class. The embodiment also includes extracting a set of candidate features from the attribute data using a feature extraction module that evaluates the attribute data using first and second machine learning models, where the first machine learning model includes a first term that computes a normalized term frequency and a second term that computes a modified inverse document frequency value that includes a sum of term frequencies, where the first machine learning model scores terms in the input document by calculating a product of the normalized term frequency and the modified inverse document frequency value and outputs a first portion of the set of candidate features ranked according to the term scores, and where the second machine learning model includes outputs a second portion of the set of candidate features. The embodiment also includes calculating feature-selection values for respective features of the set of candidate features, wherein the calculating includes normalizing the term scores and ranking the set of candidate features based on a feature-selection algorithm. The embodiment also includes generating tag information for a remote computing asset using a machine learning classifier that predicts the tag information based on the feature-selection values. Other embodiments of this aspect include corresponding computer systems, apparatus, and computer programs recorded on one or more computer storage devices, each configured to perform the actions of the embodiment.

Some embodiments include establishing a connection over a network with the remote computing asset, detecting that the tag information for the remote computing asset includes predetermined identifying information, and initiating an action at the remote computing responsive to detecting that the tag information includes the predetermined identifying information.

In some embodiments, the calculating of the feature-selection values further includes adjusting feature selection values for one of the first and second portions of the set of candidate features based on custom feature selection data representative of a user selection of one of a plurality of feature selection options. Some such embodiments include providing remote access to a user over a network so the user can select one of the plurality of feature selection options. Alternatively, or additionally, in some such embodiments, the plurality of feature selection options include a first feature selection option that prioritizes accuracy and a second feature selection option that prioritizes explainability.

In some embodiments, the second machine learning model includes a neural network. In some such embodiments, the first machine learning model includes a first term that computes a normalized term frequency and a second term that computes a modified inverse document frequency value that includes a sum of term frequencies.

Some embodiments include routing text data of the attribute data to the first and second machine learning models of the feature extraction module, and routing non-text data of the attribute data to a feature engineering module that processes the non-text data in parallel with the first and second machine learning models.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 5 depicts a table showing an example of how penalty values associated with respective tradeoff indicator values affect feature values associated with outputs from the feature extraction module in accordance with an illustrative embodiment.

DETAILED DESCRIPTION

Figure 1:
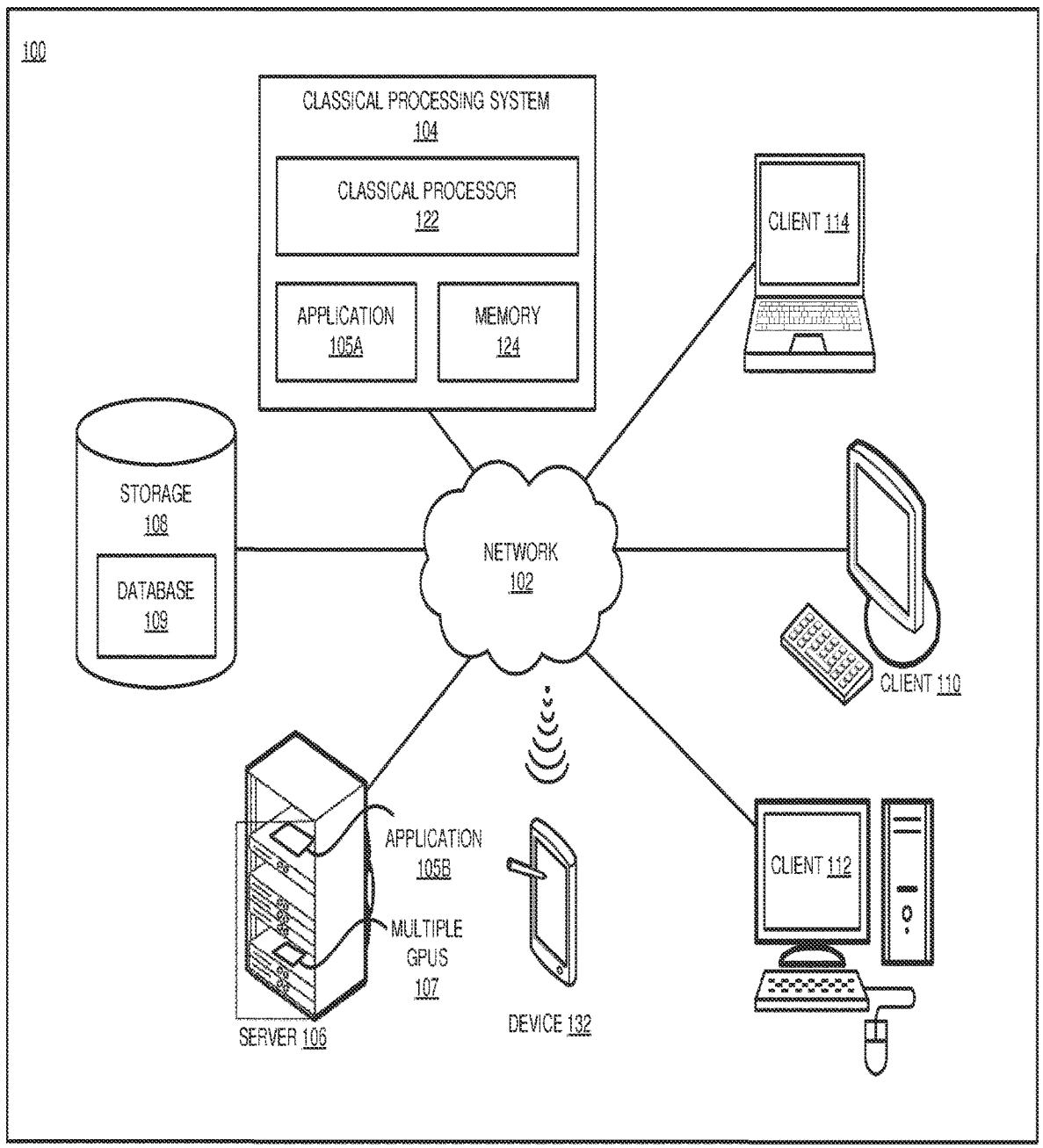
FIG. 1 depicts a block diagram of a network of data processing systems in which illustrative embodiments may be implemented.

The number of cloud computing assets in many organizations continues to grow, and for some organizations the number of assets is quickly growing to, or has already surpassed, a point where it is impractical for users to manually manage so many assets. For example, there are now companies that have cloud computing assets that number into the hundreds of thousands. For such companies that assign multiple categories to each asset, it is impractical to categorize and tag such a large number of assets. For this reason, many companies currently have a large percentage of digital assets that remain uncategorized or tagged. For example, many companies have categories associated with less than half of their digital assets, with some companies having categories assigned to 10% or fewer of their cloud computing assets.

Management of digital assets is further complicated by the fact that organizations within many companies have the authority to independently provision and configure digital assets from multiple different providers. To further complicate things, each provider typically has a different and unique process for tagging and tracking digital assets; some provisioned assets are repurposed and reclassified as organizations shift their strategic focus; and new digital assets arise quickly because many cloud providers include automatic software installation and configuration as a standard part of system deployment.

Thus, the illustrative embodiments recognize that it is increasingly challenging for companies to maintain and implement a classification policy across all digital asset providers and internal organizations. The illustrative embodiments also recognize that a cognitive asset management system that provides accurate recognition and classification results would be useful for automating many tasks associated with the management of digital assets. These and other features of such a system would give companies and responsible personnel an improved ability to tag, track, and report on digital assets, including the ability to track spending and usage of such assets.

An illustrated embodiment includes a machine learning system that learns from the assets that a company has already tagged and then accurately predicts tagging information for the remaining untagged assets. The illustrative embodiments recognize that combining one or more feature extraction models with a classification model such that the classification model uses output from the feature extraction model provides for improved accuracy over using the classification model on its own. For example, an embodiment includes a deep learning model with a modified Term Frequency-Inverse Document Frequency (TF-IDF) model, which provide a combined feature output that provides the input for a classification model that then predicts a label value for a given class.

The illustrative embodiments also recognize that implementing a feature extraction module that combines a deep learning model with a modified TF-IDF model results in a combination of models that have complementary strengths and weaknesses for feature extraction. For example, deep learning models capture both keywords and sequential patterns, while the disclosed modified TF-IDF model identifies the most discriminative keywords. Also, while deep learning models provide a high level of accuracy, the explainability of the deep learning results is difficult to understand, as opposed to that of a TF-IDF model that is text-based and much easier to follow than a deep learning model.

The illustrative embodiments further recognize that the process of combining the outputs of a deep learning model with a modified TF-IDF model involves making a trade-off between the accuracy of deep learning models and the explainability of the modified TF-IDF models that can be passed along to the user. For example, the text-based features output from the disclosed modified TF-IDF and from traditional feature engineering are easier to understand than probability vectors output from a deep learning classifier. The feature list output from the deep learning classifier is combined with the output from the modified TF-IDF model and from traditional feature engineering to provide an input to a final classification model. When those groups of features are combined, the accuracy and explainability of the final output is influenced by the percentage of inputs to the final classification module from the deep learning model and the remaining percentage from the modified TF-IDF model and from traditional feature engineering.

Thus, the illustrated embodiments allow a user to influence the tradeoff between the accuracy and explainability of the final output. For example, in an embodiment, a user provides an input indicative of a preference for prioritizing accuracy or explainability of the final classifier output. Also, in some such embodiments, a user provides an input indicative of a degree of preference for prioritizing the accuracy or explainability of the final classifier output.

In an embodiment, a customizable feature selection module combines the feature list output from the deep learning classifier with the output from the modified TF-IDF model and from traditional feature engineering according to a desired tradeoff between the accuracy or explainability of the final classifier output. In some such embodiments, the customizable feature selection module introduces a weight or penalty value to the feature list output from the deep learning classifier or to the output from the modified TF-IDF model and from traditional feature engineering according to a desired tradeoff. For example, in some such embodiments, the customizable feature selection module penalizes the feature list output from the deep learning classifier by a penalty amount that depends on a user input indicative of an extent to which a user prefers explainability over accuracy.

In an illustrated embodiment, the customizable feature selection module uses a feature selection metric to select a subset of features from the combined feature list that results from combining the output from the deep learning classifier and the output from the modified TF-IDF model and from traditional feature engineering. In an embodiment, the feature selection metric includes a feature selection algorithm, such as an Information Value (IV) algorithm that expresses an amount of information associated with a feature and normalizes the feature values output from the various models to allow the features to be ranked based on importance. In an embodiment that uses the IV metric, the IV for deep learning features is adjusted according to a penalty amount that depends on a user input indicative of an extent to which a user prefers explainability over accuracy. For example, in some such embodiments, a customizable feature selection module adjusts the IV for deep learning features according to a penalty amount between 0 and 1 that depends on a user input indicative of an extent to which a user prefers explainability over accuracy. In alternative embodiments, there are many techniques other than the IV process that can be used to select a subset of features before inputting them into the final classifier model. For example, alternative techniques for selecting features to input to the final classifier include known feature selection metrics such as Mutual Information (MI) and Kolmogorov-Smirnov (K-S).

The illustrative embodiments further recognize that the use of a TF-IDF model makes it easier to understand how the occurrence of a specific word in a text field contributes to the asset being associated with a class label. However, accuracy is also a key goal, so the illustrative embodiments recognize that a modified TF-IDF is more accurate if it is more closely associated with a desired context by modifying the TF-IDF to re-define an input document to the TF-IDF. The illustrative embodiments also recognize that a modified TF-IDF is more accurate if the IDF component is revised to include term frequency information in place of a binary indication of a number of documents containing the term.

The illustrative embodiments used to describe the invention generally address and solve the above-described problems and other problems related to managing digital assets, including appropriately classifying and labeling digital assets. The illustrative embodiments provide a method, system, and computer program product for categorizing and tagging cloud computing assets.

In an illustrated embodiment, an application for classifying digital assets receives input data that includes attribute data for cloud computing assets in the form of text and non-text data. A non-limiting example of input data includes data extracted from a bill or invoice or other data source for cloud assets computing that includes cost and usage information from one or more providers of cloud computing assets, as well as other data representative of various attribute information that can be mapped to a list of generic attribute columns, such as the following non-limiting example, which is included as an example only for clarity purposes:

```
generic_asset_data = asset_data[[
    'provider',
    'billing account id',
    'asset account id',
    'asset id', # language data
    'asset name', # language data
    'budgetary unit', # language data
    'capacity', # language data
    'region code',
    'asset type',
    'correlation asset id',
    'category',
    'status',
    'utilization',
    'age',
    'cost',
    'tags' # existing tags [{"environment":"production"},
    {"cost-center":"b2c"}, ...]
]]
```

Note that in some embodiments, the attribute columns (labeled as "language data") contain unstructured text data, while others are structured data.

In an illustrated embodiment, an application for classifying digital assets receives input data that is input to a feature extraction module that includes level-1 models that are chosen to have complementary strengths. For example, in an embodiment, the feature extraction module includes a deep learning model and a modified TF-IDF model for receiving text input data and standard feature engineering and aggregations for non-text input data. In an embodiment, the output from the feature extraction module includes a plurality of candidate features that are provided to a customizable feature selection module. In an embodiment, the customizable feature selection module ranks the candidate features in order of importance. In some embodiments, the customizable feature selection module ranks the candidate features based at least in part on a user input. For example, in some embodiments, the customizable feature selection module ranks the candidate features based at least in part on a user input indicative of a degree of user preference for prioritizing the accuracy or explainability of the final classifier output. In some embodiments, the customizable feature selection module provides the ranked list of features to a classification module to make a final prediction.

In an illustrated embodiment, a modified TF-IDF module creates an input document by merging text fields of assets tagged with a same class label (label-1) to form a single document D(label-1). In some such embodiments, the modified TF-IDF modules calculates scores for all terms in the document. In some embodiments, the top N most important terms in the context of a class label are chosen based on the highest scores and are placed in a term list term_list(label-1). Thus, in such embodiments, for a category with M unique class labels, the modified TF-IDF module uses a modified TF-IDF model to produce N×M terms corresponding to features for a subsequent classification module. In some embodiments, the output terms are vectorized to create new features using the following unique format: tfidf_<text_field>_<term> where "tfidf" in the feature name indicates the model used, "<text_field>" indicates the source text field, and "<term>" indicates the term to be tracked during feature generation. In some embodiments, the <text_field> in the format provides a way to create a separate feature if a term occurs in more than one text field.

In an illustrated embodiment, a modified TF-IDF module is composed of two parts: Term Frequency (TF) and a modified Inverse Document Frequency (IDF). In an embodiment, the TF measures how frequently a term occurs in a document. In an embodiment, a modified IDF measures the importance of a term using expression (1) shown below that considers how many times the term is found in each document by including the frequency of the terms in IDF:

$$\text{Mod\_IDF}(t) = \log_e(\text{Total number of documents/Sum of TF}(t) \text{ of all documents}) \quad (1)$$

In some embodiments, a feature extraction module includes a Deep Learning classifier module that includes a deep learning model for capturing both keywords and sequential patterns. In some such embodiments, the feature extraction module trains the deep learning model directly with values in each text field. In some such embodiments, the Deep Learning model includes a deep neural network having a softmax activation function in the output layer thereof that represents a categorical distribution over class labels and provides probabilities of each input text data belonging to a class label. In some such embodiments, the resulting probability vector is output to the customizable feature selection module that ranks the candidate features based at least in part on a user input indicative of a degree of user preference for prioritizing the accuracy or explainability of the final classifier output. In some embodiments, the customizable feature selection module provides the ranked list of features to a classification module to make a final prediction. In some embodiments, feature columns generated from the deep learning classifier are labeled in the following format: prob_<text_field>_<class_label>

In an illustrated embodiment, the feature extraction module outputs enhanced features formatted using unique format. For example, in some embodiments, the output from the modified TF-IDF model is formatted as tfidf_<text_field>_<term> where "tfidf" indicates that the modified TF-IDF model was used, "<text_field>" indicates the source text field, and "<term>" indicates the term to be tracked during feature generation. In some embodiments, the output from the deep learning model is formatted as prob_<text_field>_<class_label> where "prob" indicates that the deep learning model was used, "<text_field>" indicates the source text field, and "<class_label>" indicates the label to be tracked during feature generation. In some embodiments, the output from the traditional feature engineering is formatted as <text_field>_<value_in_field> where "<text_field>" indicates the source text field, and "<value_in_field>" indicates the value of the contents of the feature. By differentiating the outputs from the different level-1 models in the feature extraction module in new feature names, the application allows visibility into the effectiveness of the individual models during model evaluation and feature selection for the level-2 classification model in the classification module. For example, by including the <text_field> as part of the new feature name, the application can evaluate each language data column independently of one another and allows for a situation where a same word is identified in multiple language data columns.

The following non-limiting example is provided for the sake of improved clarity. In an embodiment, input data includes a category "org-cost-center" and two text data fields—"asset name" and "budgetary unit." In this example, the category "org-cost-center" category has twelve unique class labels. The twelve class labels are found by using the TF-IDF model to find the twelve most discriminative terms from text field "asset name." In this example, the twelve class labels that are found in the "asset name" column using TF-IDF are "5545," "9Z8A," "IT25," "Weatherfx," "analytics," "aviation," "b2c," central-facility," "gwrc-shared," "sensors," "wx-systems-mixed-use," and "wxu." Thus, twelve documents are created, one for each of the twelve class labels found in the "asset name" column. The content of each document is the merged text of all "asset name" grouped by the corresponding class label. In each document, the modified TF-IDF algorithm is used to calculate the TF-IDF scores for all unique terms. The terms are ranked by TF-IDF score, and the application generates a list "terms_list_asset_name" of the M terms with the highest TF-IDF scores. This process is repeated for the other text field "budgetary unit" to generate a list "terms_list_budgetary_unit" of the terms from the "budgetary unit" column having the M highest TF-IDF scores. Examples of term lists "terms_list_asset_name" and "terms_list_budgetary_unit" are shown in Table 1 below.

TABLE 1

| "terms_list_asset_name" | "terms_list_budgetary_unit" |
|---|---|
| { <br>   "term_list":[ <br>     "www", <br>     "aq", <br>     "api", <br>     "us", <br>     "eu", <br>     "web", <br>     "container", <br>     "for", <br>     "gridded", <br>     "sun", <br>     "useast", <br>     "Pb", <br>     "instance", <br>     "prod", <br>     "pws", <br>     "insinkerator", <br>     "ecs", <br>     "flightfx", <br>     "east", <br>     "ingest", <br>     "qa", <br>     "dpe", <br>     "emr", <br>     "ssds" <br>   ], <br>   "category":"org-cost-center", <br>   "text field":"asset name" <br> } | { <br>   "term_list":[ <br>     "wxu", <br>     "www", <br>     "general", <br>     "ba", <br>     "wsi", <br>     "sun", <br>     "energy", <br>     "cf", <br>     "dev", <br>     "scb", <br>     "qa", <br>     "analytics", <br>     "api", <br>     "combined", <br>     "nonprod", <br>     "aviation", <br>     "prod", <br>     "wsimedia", <br>     "weatherfx" <br>   ] <br>   "category":"org-cost-center", <br>   "text_field":"budgetary unit" <br> } |

Next, to create new features from the "asset name" terms list, each asset's "asset name" field is searched for any (binary) occurrence of terms in the "terms_list_asset_name" list, and the results are vectorized as new features. Similarly, to create new features from the "budgetary unit" terms list, each asset's "budgetary unit" field is searched for any (binary) occurrence of terms in the "terms_list_budgetary unit" list, and the results are vectorized as new features. Example of new features based on the first term from each list above: tfidf_assetname_www is the first feature from the "asset name" list, and tfidf_budgetaryunit_wxu is the first feature from the "budgetary unit" list.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
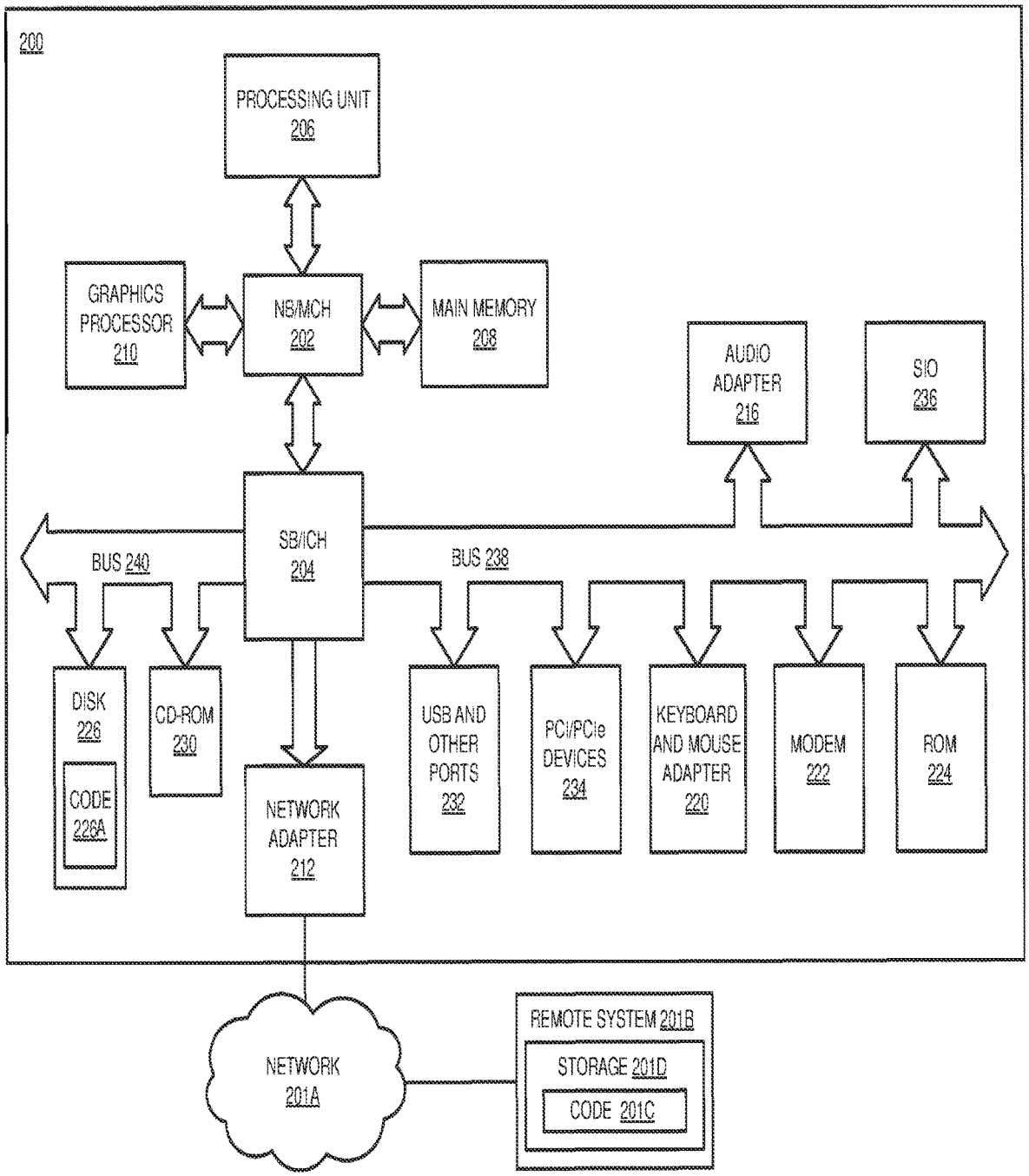
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by application 105B such as initiating processes described herein of the neural network. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or both of application 105A of data processing system 104 and application 105B of server 106 implements an embodiment of a classifier application as disclosed herein and implements a tag-based application. In an embodiment, one of application 105A of data processing system 104 and application 105B of server 106 implements an embodiment of a classifier application as disclosed herein and the other implements a tag-based application. A "tag-based application" as used herein refers to any application that initiates some action, locally and/or on a remote computing asset, based on the computing asset's tag information or portions of tag information, and includes the ability to detect tag information so that the tag information can be used as a basis for determining whether to perform such actions. For example, tag-based applications include applications that use a remote computing asset's tag information to associate the asset's costs with various cost-allocation dimensions, for example technical or security dimensions, such as specific applications, environments, or compliance programs and generate cost allocation reports that reflect this cost association. As another example, tag-based applications include applications that perform various automation activities on only particular remote computing assets based on the asset's tag information, such as archiving, updating, or deleting resources, start or stop environments (e.g., turn off development environments during non-business hours to reduce costs). As yet another example, tag-based applications include applications that perform various security-related activities on only particular remote computing assets based on the asset's tag information, such as constraining permissions, updating user or role permissions, and other actions related to access control. In some embodiments, an embodiment of a classifier application as disclosed herein and a tag-based application are combined in a single application.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
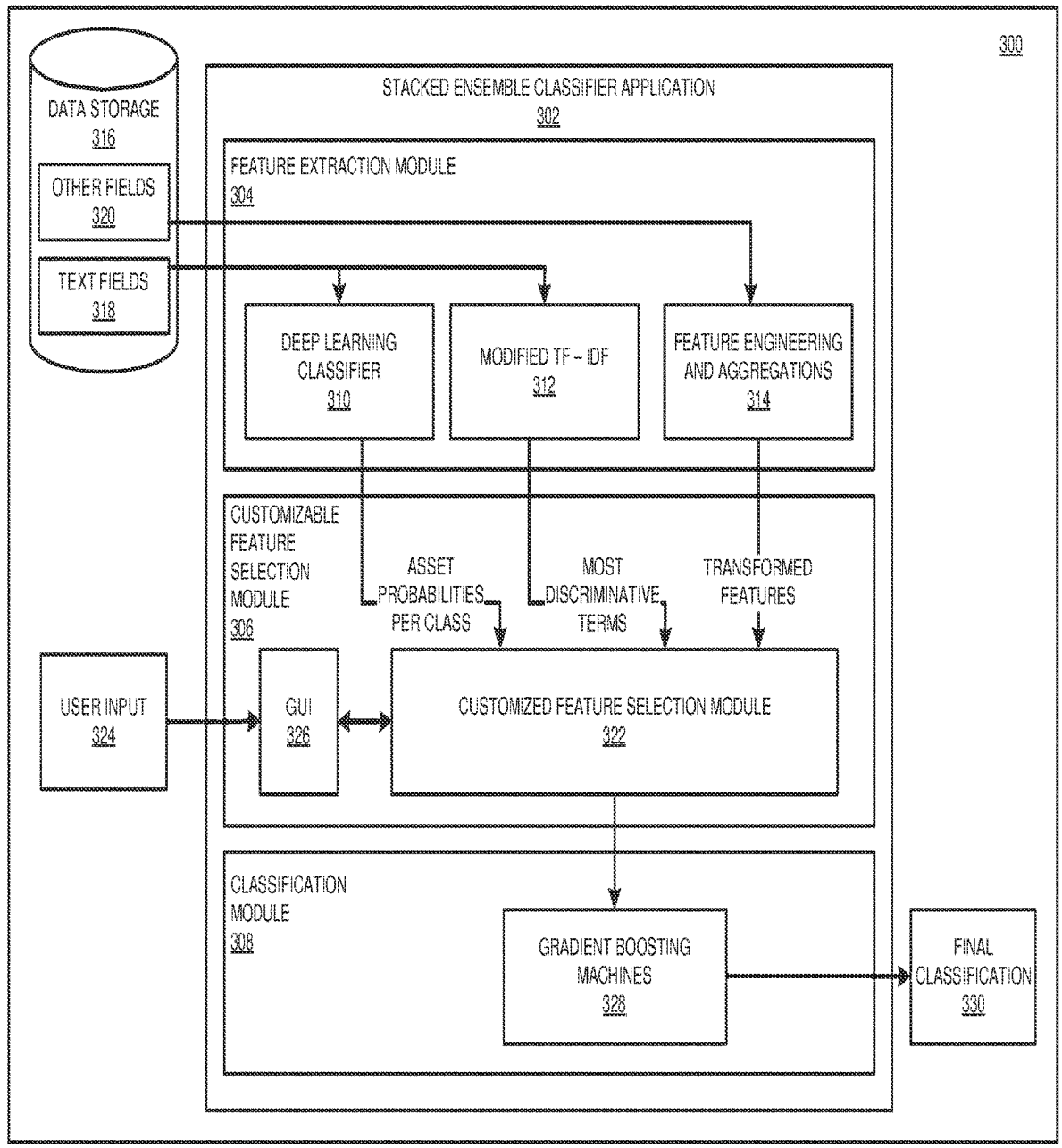
FIG. 3 depicts a block diagram of an example environment for a stacked ensemble classifier application in accordance with an illustrative embodiment.

With reference to FIG. 3, this figure depicts a block diagram of an example environment 300 for a stacked ensemble classifier application 302 in accordance with an illustrative embodiment. In a particular embodiment, application 302 is an example of application 105A and/or 105B of FIG. 1.

In some embodiments, the stacked ensemble classifier application 302 includes a feature extraction module 304, a customizable feature selection module 306, and a classification module 308. In alternative embodiments, the neural network application 302 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In an embodiment, a stacked ensemble classifier application 302 for classifying cloud computing assets receives input data that is input to the feature extraction module 304, where the feature extraction module 304 includes level-1 models that are chosen to have complementary strengths. For example, in an embodiment, the feature extraction module 304 includes a deep learning classifier 310 and a modified TF-IDF model 312 for receiving text input data, and includes standard feature engineering and aggregations for receiving non-text input data. In an embodiment, the output from the feature extraction module includes a plurality of candidate features that are provided to a customizable feature selection module 306. In an embodiment, the customizable feature selection module 306 ranks the candidate features in order of importance. In some embodiments, the customizable feature selection module 306 ranks the candidate features based at least in part on a user input. For example, in some embodiments, the customizable feature selection module 306 ranks the candidate features based at least in part on a user input 324 via a graphical user interface (GUI) 326 indicative of a degree of user preference for prioritizing the accuracy or explainability of the final classifier output. In some embodiments, the customizable feature selection module 306 provides the ranked list of features to the classification module 308 to make a final prediction.

In an embodiment, the feature extraction module 304 includes that combines a deep learning classifier 310 and a modified TF-IDF model 312, which are models that have complementary strengths and weaknesses for feature extraction. For example, deep learning models capture both keywords and sequential patterns, while the disclosed modified TF-IDF model identifies the most discriminative keywords. Also, while deep learning models provide a high level of accuracy, the explainability of the deep learning results is difficult to understand, as opposed to that of a TF-IDF model that is text-based and much easier to follow than a deep learning model.

In some embodiments, the feature extraction module 304 receives input data from data storage 316 in the form of text fields 318 and other (non-text) fields 320 outputs a set of candidate features. In an embodiment, the feature extraction module 304 input data that includes attribute data for cloud computing assets in the form of text and non-text data. A non-limiting example of input data includes data extracted from a bill or invoice or other data source for cloud assets computing that includes cost and usage information from one or more providers of cloud computing assets, as well as other data representative of various attribute information that can be mapped to a list of generic attribute columns.

In an embodiment, the feature extraction module 304 includes a modified TF-IDF model 312 that has improved accuracy over prior TF-IDF models because it has been modified to be more closely associated with a desired context due to a revised input document created by the TF-IDF and also due to a revision to the TF-IDF algorithm that adds term frequency information in place of a binary indication of a number of documents containing the term.

In an illustrated embodiment, the modified TF-IDF module 312 creates an input document by merging text fields of assets tagged with a same class label (label-1) to form a single document D(label-1). In some such embodiments, the modified TF-IDF modules calculates scores for all terms in the document. In some such embodiments, the top N most important terms in the context of a class label are chosen based on the highest scores and are placed in a term list term_list(label-1). Thus, in such embodiments, for a category with M unique class labels, the modified TF-IDF module uses a modified TF-IDF model to produce N×M terms corresponding to features for a subsequent classification module. In some such embodiments, the output terms are vectorized to create new features using the following unique format: tfidf_<text_field>_<term> where "tfidf" in the feature name indicates the model used, "<text_field>" indicates the source text field, and "<term>" indicates the term to be tracked during feature generation. In some embodiments, the <text_field> in the format provides a way to create a separate feature if a term occurs in more than one text field.

In an illustrated embodiment, the modified TF-IDF module 312 includes two parts: Term Frequency (TF) and a modified Inverse Document Frequency (IDF). In an embodiment, the TF measures how frequently a term occurs in a document. In an embodiment, a modified IDF measures the importance of a term using expression (1) shown below that considers how many times the term is found in each document by including the frequency of the terms in IDF:

$$\text{Mod\_IDF}(t)=\log e(\text{Total number of documents/Sum of TF}(t) \text{ of all documents}) \tag{1}$$

In some embodiments, the feature extraction module 304 includes a Deep Learning classifier module 310 that includes a deep learning model for capturing both keywords and sequential patterns. In some such embodiments, the feature extraction module 304 trains the deep learning model directly with values in the text fields 318 of the input data. In some such embodiments, the Deep Learning model includes a deep neural network having a softmax activation function in the output layer thereof that represents a categorical distribution over class labels and provides probabilities of each input text data belonging to a class label. In some such embodiments, the resulting probability vector is output to the customizable feature selection module 306.

In an illustrated embodiment, the feature extraction module 306 outputs enhanced features formatted using unique formats for features from each of the models and features from other sources, such as standard feature engineering and aggregation processes. For example, in some embodiments, the output from the modified TF-IDF module 312 is formatted as tfidf_<text_field>_<term> where "tfidf" indicates that the modified TF-IDF model was used, "<text_field>" indicates the source text field, and "<term>" indicates the term to be tracked during feature generation. In some embodiments, the output from the deep learning classifier module 310 is formatted as prob_<text_field>_<class_label> where "prob" indicates that the deep learning model was used, "<text_field>" indicates the source text field, and "<class_label>" indicates the label to be tracked during feature generation. In some embodiments, the output from the traditional feature engineering module 314 is formatted as <text_field>_<value_in_field> where "<text_field>" indicates the source text field, and "<value_in_field>" indicates the value of the contents of the feature. By differentiating the outputs from the different level-1 modules in the feature extraction module 304 in new feature names, the application 302 allows visibility into the effectiveness of the individual models during model evaluation and feature selection for the level-2 classification model in the classification module 308. For example, by including the <text_field> as part of the new feature name, the application can evaluate each language data column independently of one another and allows for a situation where a same word is identified in multiple language data columns.

In an embodiment, the customizable feature selection module 306 combines the outputs of the deep learning classifier module 310, the modified TF-IDF module 312, and the feature engineering module 314. The combining of these outputs involves making a trade-off between the accuracy of the deep learning classifier module 310 and the explainability of the modified TF-IDF module 312. In an embodiment, the trade-off between the accuracy of the deep learning classifier module 310 and the explainability of the modified TF-IDF module 312 is at least partially controlled by a user. For example, the text-based features output from the disclosed modified TF-IDF module 312 and from traditional feature engineering module 314 are easier to understand than the probability vectors output from the deep learning classifier module 310. The feature list output from the deep learning classifier module 310 is combined with the output from the modified TF-IDF module 312 and from traditional feature engineering module 314 to provide an input to a final classification module 308. When those groups of features are combined, the accuracy and explainability of the final output is influenced by the percentage of inputs to the final classification module 308 from the deep learning classification module 310 and the remaining percentage from the modified TF-IDF module 312 and from traditional feature engineering module 314.

In an embodiment, the customizable feature selection module 306 allows a user to influence the tradeoff between the accuracy and explainability of the final output. For example, in an embodiment, a user provides an input 324 via a GUI 326 indicative of a preference for prioritizing accuracy or explainability of the final classifier output. Also, in some such embodiments, a user provides an input 324 indicative of a degree of preference for prioritizing the accuracy or explainability of the final classifier output.

Figure 4:
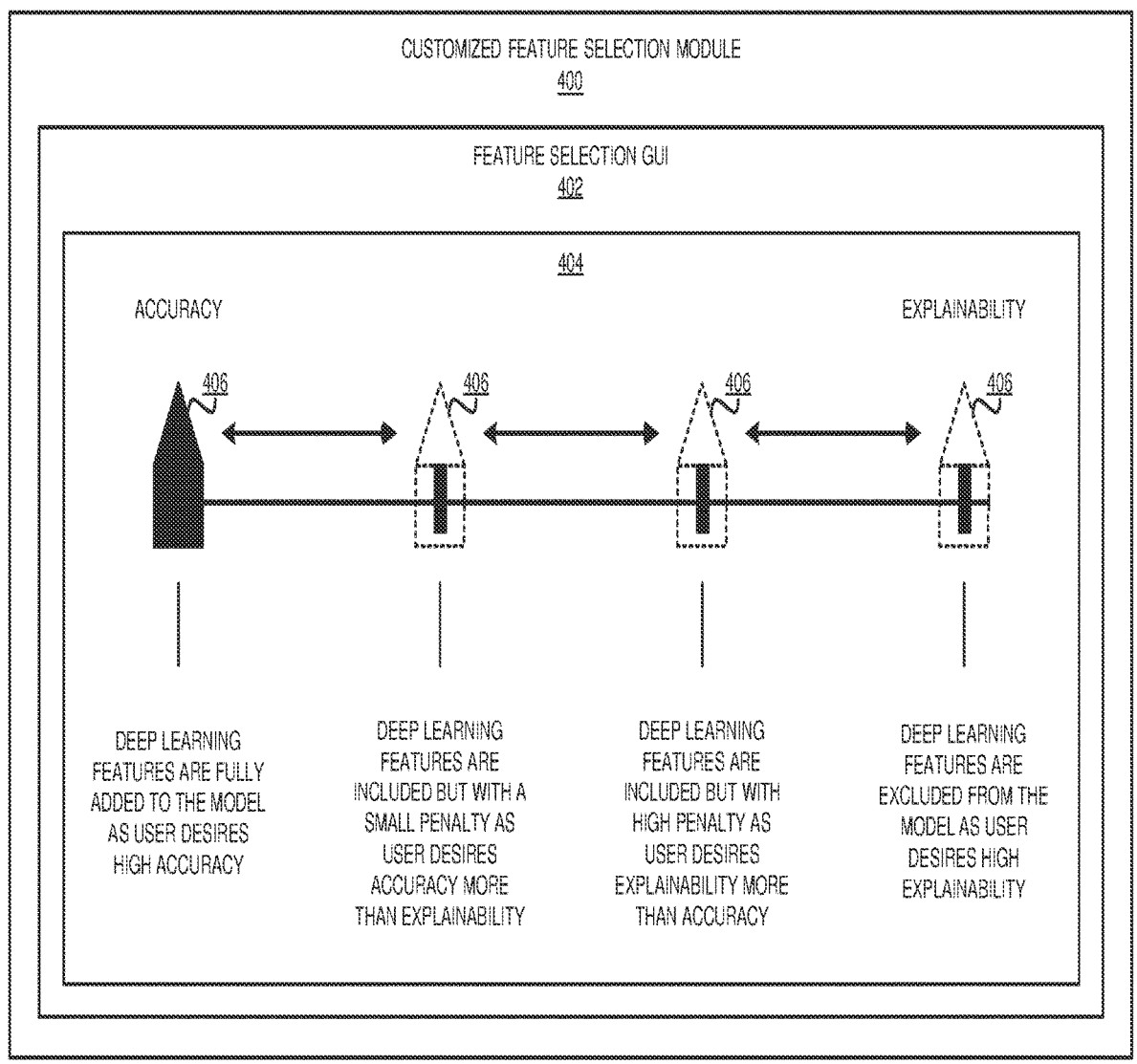
FIG. 4 depicts a graphical user interface for outputting a tradeoff indicator value in accordance with an illustrative embodiment.

With reference to FIG. 4, this figure depicts a GUI 404, which is an example of GUI 326 of FIG. 3 for outputting a tradeoff indicator value in accordance with an illustrative embodiment. In an embodiment, a default tradeoff indicator value is associated with a preference for an emphasis on accuracy as indicated by the tradeoff indicator icon 406, where the GUI indicates that deep learning features are fully added to the model as user desires high accuracy. Furthermore, the tradeoff indicator icon 406 provides a dynamically modifiable slidable scale indicating the user-selected tradeoff preference from accuracy to explainability and selectable points therebetween. The arrows indicate the directions of slidable motion of the tradeoff indicator icon 406 from the default solid icon location to any of the alternative locations indicated by illustration of the tradeoff indicator icon 406 in broken lines. In an embodiment, the default value is associated with a location other than that indicated by the solid icon 406. In an embodiment, the number of user-selectable locations includes a greater number of locations or a fewer number of locations than that shown in FIG. 4.

Referring back to FIG. 3, in an embodiment, the customizable feature selection module 306 combines the feature list output from the deep learning classifier module 310 with the output from the modified TF-IDF module 312 and from traditional feature engineering module 314 according to a desired tradeoff between the accuracy or explainability of the final classifier output. In some such embodiments, the customizable feature selection module 308 introduces a weight or penalty value to the feature list output from the deep learning classifier module 310 or to the output from the modified TF-IDF module 312 and from traditional feature engineering module 314 according to a desired tradeoff. For example, in some such embodiments, the customizable feature selection module 306 penalizes the feature list output from the deep learning classifier module 310 by a penalty amount that depends on the user input 324 via the GUI 326 indicative of an extent to which a user prefers explainability or accuracy.

With reference to FIG. 5, this figure depicts a table 500, which shows an example of how penalty values associated with respective tradeoff indicator values affect feature values associated with outputs from the feature extraction module 304. In the illustrated embodiment, penalty values associated with respective tradeoff indicator values can include values associated with respective slider positions in a GUI 326 having five possible selection locations from one position at maximum Accuracy to another position at maximum Explainablity, with three other positions distributed therebetween.

In an illustrated embodiment, the customizable feature selection module uses a feature selection metric to select a subset of features from a combined feature list that results from combining the outputs from the deep learning classifier module 310, the modified TF-IDF module 312, and the traditional feature engineering module 314. In an embodiment, the feature selection metric includes a feature selection algorithm, such as the known Information Value (IV) algorithm that expresses an amount of information associated with a feature and normalizes the feature values output from the various models to allow the features to be ranked based on importance. In an embodiment, non-limiting examples of features from the deep learning classifier module 310 and the modified TF-IDF module 312 are listed in column 502. In the illustrated embodiment, the customizable feature selection module 306 calculates the IV values listed in column 504 for each of the listed features in column 502. In alternative embodiments, there are many techniques other than the IV process that the customizable feature selection module 306 can use to select a subset of features before inputting them into the classification module 308. For example, alternative techniques for selecting features to input to the final classifier include known feature selection metrics such as: mutual information (MI) and Kolmogorov-Smirnov (K-S).

In an embodiment, the customizable feature selection module 306 adjusts the IV values by a penalty amount that depends on a user input indicative of an extent to which a user prefers explainability over accuracy. In the illustrated example, the customizable feature selection module 306 adjusts the IV for deep learning features according to a penalty amount between 0 and 1 that depends on a user input indicative of an extent to which the user prefers explainability over accuracy. In the illustrated embodiment, the customizable feature selection module 306 identifies the deep learning features by searching for features beginning with "prob_" and makes the penalty adjustment to the corresponding IV value. As shown in FIG. 5, the top three features by IV value changes according to the user preference resulting in the values shown in columns 506, 508, 510, 512, and 514 for penalty values P=0, 0.2, 0.4, 0.8, and 1, respectively. In the illustrated example, a user preference for accuracy results in the top three features being PROB_BUDGETARYUNIT_PROD, PROB_BUDGETARYUNIT_QA, and TFIDF_ASSETNAME_DEV, which includes two output features from the deep learning classifier 310 and one output from the modified TF-IDF module 312, and therefore reflects the user preference for accuracy by including more features from the more accurate deep learning classifier 310. On the other hand, the user preference for explainability changes the top three features to TFIDF_ASSETNAME_DEV, TFIDF_ASSETNAME_QA, and TFIDF_BUDGETARYUNIT_DEV, which are all three output from the modified TF-IDF module 312, and therefore reflects the user preference for explainability by including more features from the more explainable modified TF-IDF module 312.

Referring back to FIG. 3, in an embodiment, the stacked ensemble classifier application 302 includes a classification module 308 that receives the top F features from the customizable feature selection module 306. In the illustrated embodiment, the classification module 308 that receives the top three features from the customizable feature selection module 306. However, in alternative embodiments, the number F varies depending on implementation. For example, a greater number F can increase time and cost involved with the classification process performed by the classification module 308.

In the illustrated embodiment, the classification module 308 includes gradient boosting machines module 328 for receiving the top F features from the customizable feature selection module 306 and outputting corresponding classification predictions as final classification output 330, which constitutes an example of generating tag information for the remote computing asset associated with the input data. In an embodiment, the stacked ensemble classifier application 302 establishes a connection over a network with the remote computing asset associated with the input data, and communicates the tag information to the remote computing asset.

In an embodiment, the classification module 308 includes a gradient boosting machines module 328 that has been trained using attribute data for cloud computing assets that have already been classified. In an embodiment, the classification module 308 includes a gradient boosting machines module 328 that has been trained and tested using attribute data for cloud computing assets that have already been classified. As a non-limiting example, a given company has 30% of its cloud computing assets classified and tagged, so the classification module 308 includes a gradient boosting machines module 328 that has been trained using and tested using attribute data for the 30% of cloud computing assets that have already been classified, such as 25% for training and 5% for testing or 20% for training and 10% for testing. While the illustrated embodiment includes a gradient boosting machines module 328, alternative embodiments include other types of classification models.

Figure 6:
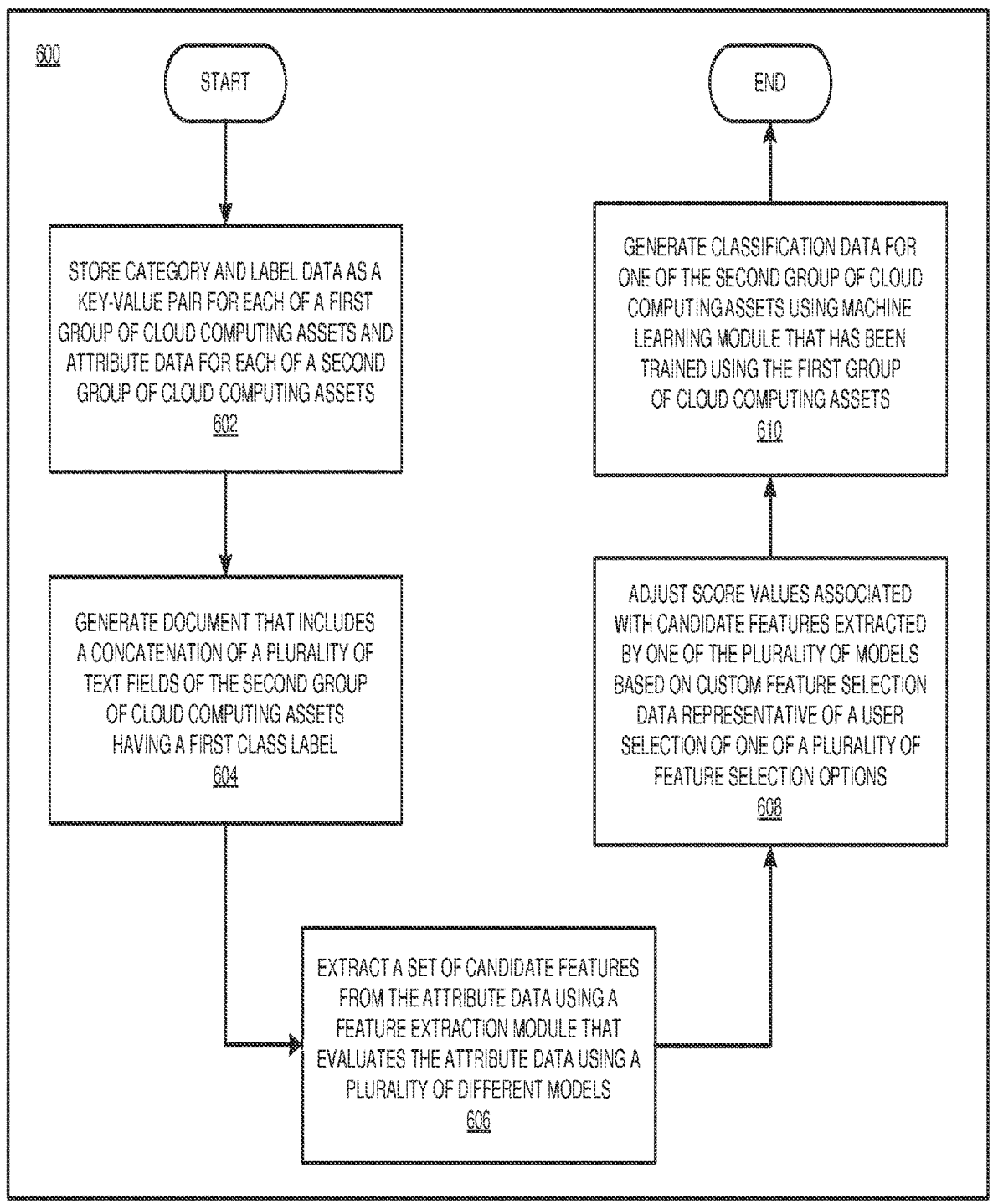
FIG. 6 depicts a flowchart of an example process for cognitive categorization of digital assets in accordance with an illustrative embodiment.

With reference to FIG. 6 this figure depicts a flowchart of an example process 600 for cognitive categorization of digital assets. In a particular embodiment, the stacked ensemble classifier application 302 carries out the process 600.

In an embodiment, at block 602, the process stores category and label data as a key-value pair for each of a first group of cloud computing assets and attribute data for each of a second group of cloud computing assets. In an embodiment, at block 604, the process generates a document that includes a plurality of text fields of the second group of cloud computing assets having a first class label.

In an embodiment, at block 606, the process extracts a set of candidate features from the attribute data using a feature extraction module that evaluates the attribute data using a plurality of different models. In some embodiments, the plurality of different models includes a first machine learning model that scores terms in the input document and outputs a first portion of the set of candidate features ranked according to the term scores. In some embodiments, the first machine learning model includes a first term that computes a normalized term frequency and a second term that computes a modified inverse document frequency value that includes a sum of term frequencies. In some embodiments, the process includes routing text data of the attribute data to the first and second machine learning models of the feature extraction module, and routing non-text data of the attribute data to a feature engineering module that processes the non-text data in parallel with the first and second machine learning models.

In some embodiments, the plurality of different models includes a second machine learning model that includes a deep learning model, for example comprising a neural network, and outputs a second portion of the set of candidate features ranked according to term probabilities. In some embodiments, the process includes calculating feature-selection values for respective features of the set of candidate features, wherein the calculating includes normalizing the term scores and ranking the set of candidate features based on a feature-selection algorithm.

In an embodiment, at block 608, the process adjusts score values associated with candidate features extracted by one of the plurality of models based on custom feature selection data representative of a user selection of one of a plurality of feature selection options. In some embodiments, the process includes providing remote access to a user over a network so the user can select one of the plurality of feature selection options. In some embodiments, the plurality of feature selection options include a first feature selection option that prioritizes accuracy and a second feature selection option that prioritizes explainability.

In an embodiment, at block 610, the process generates classification data for one of the second group of cloud computing assets using machine learning module that has been trained using the first group of cloud computing assets. In some embodiments, the classification data includes tag information for a remote computing asset using a machine learning classifier that predicts the tag information based on the feature-selection values. In some embodiments, the process includes establishing a connection over a network with the remote computing asset, detecting that the tag information for the remote computing asset includes predetermined identifying information, and initiating an action at the remote computing responsive to detecting that the tag information includes the predetermined identifying information.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

It is claimed:

1. A computer-implemented method comprising:
   extracting a set of candidate features from a generated input document using a feature extraction module that evaluates attribute data of the input document using first and second machine learning models, wherein the first machine learning model scores terms in the input document and outputs a first portion of the set of candidate features and the second machine learning model includes a deep learning model that outputs a second portion of the set of candidate features which has a ranking;
   calculating feature-selection values for respective features of the set of candidate features; and
   generating tag information for a remote computing asset using a machine learning classifier that predicts the tag information based on the feature-selection values.

2. The computer implemented method of claim 1, wherein the input document includes a plurality of text fields of attribute data associated with a group of cloud computing assets having a specified label for a specified class.

3. The computer implemented method of claim 1, wherein the extracting the set of candidate features is from attribute data using a feature extraction module that evaluates the attribute data using the first and second machine learning models.

4. The computer implemented method of claim 1, wherein the calculating includes normalizing the scores terms and ranking the set of candidate features based on a feature-selection algorithm.

5. The computer implemented method of claim 1, further comprising:
   establishing a connection over a network with the remote computing asset;
   detecting that tag information for the remote computing asset includes predetermined identifying information; and
   initiating an action at the remote computing asset responsive to detecting that the tag information includes the predetermined identifying information.

6. The computer implemented method of claim 1, wherein the calculating of the feature-selection values further includes adjusting feature selection values for one of the first and second portions of the set of candidate features based on custom feature selection data representative of a user selection of one of a plurality of feature selection options.

7. The computer implemented method of claim 6, further comprising providing remote access to a user over a network so the user can select one of the plurality of feature selection options.

8. The computer implemented method of claim 6, wherein the plurality of feature selection options include a first feature selection option that prioritizes accuracy and a second feature selection option that prioritizes explainability.

9. The computer implemented method of claim 1, wherein the second machine learning models include a neural network.

10. The computer implemented method of claim 9, wherein the first machine learning model includes a first term that computes a normalized term frequency and a second term that computes a modified inverse document frequency value that includes a sum of term frequencies.

11. The computer implemented method of claim 1, further comprising:
    routing text data of the attribute data to the first and second machine learning models of the feature extraction module; and
    routing non-text data of the attribute data to a feature engineering module that processes the non-text data in parallel with the first and second machine learning models.

12. A computer program product for cognitive categorization of digital assets, the computer program product comprising a computer readable storage medium having program instructions embodied therewith, the program instructions executable by a processor to cause the processor to perform operations comprising:
    extracting a set of candidate features from a generated input document using a feature extraction module that evaluates attribute data of the input document using first and second machine learning models, wherein the first machine learning model scores terms in the input document and outputs a first portion of the set of candidate features and the second machine learning model includes a deep learning model that outputs a second portion of the set of candidate features which has a ranking;
    calculating feature-selection values for respective features of the set of candidate features; and
    generating tag information for a remote computing asset using a machine learning classifier that predicts the tag information based on the feature-selection values.

13. The computer program product of claim 12, further comprising generating the input document that includes a plurality of text fields of attribute data associated with a group of cloud computing assets having a specified label for a specified class.

14. The computer program product of claim 13, further comprising:
    routing text data of the attribute data to the first and second machine learning models of the feature extraction module; and
    routing non-text data of the attribute data to a feature engineering module that processes the non-text data in parallel with the first and second machine learning models.

15. The computer program product of claim 12, wherein the first machine learning model outputs the first portion of the set of candidate features ranked according to the term scores, and the second machine learning model outputs the second portion of the set of candidate features ranked according to term probabilities.

16. The computer program product of claim 12, further comprising:
    establishing a connection over a network with the remote computing asset;
    detecting that the tag information for the remote computing asset includes predetermined identifying information; and
    initiating an action at the remote computing responsive to detecting that the tag information includes the predetermined identifying information.

17. The computer program product of claim 12, wherein the stored program instructions are stored in a computer readable medium in a server data processing system, and the stored program instructions are downloaded over a network to a remote data processing system for use in a computer readable medium associated with the remote data processing system.

18. The computer program product of claim 12, wherein the calculating of the feature-selection values further includes adjusting feature selection values for one of the first and second portions of the set of candidate features based on custom feature selection data representative of a user selection of one of a plurality of feature selection options.

19. The computer program product of claim 18, wherein the plurality of feature selection options include a first feature selection option that prioritizes accuracy and a second feature selection option that prioritizes explainability.

20. A computer system comprising a processor and one or more computer readable storage media, and program instructions collectively stored on the one or more computer readable storage media, the program instructions executable by the processor to cause the processor to perform operations comprising:
    extracting a set of candidate features from a generated input document using a feature extraction module that evaluates attribute data of the input document using first and second machine learning models, wherein the first machine learning model scores terms in the input document and outputs a first portion of the set of candidate features and the second machine learning model includes a deep learning model that outputs a second portion of the set of candidate features which has a ranking;
    calculating feature-selection values for respective features of the set of candidate features; and
    generating tag information for a remote computing asset using a machine learning classifier that predicts the tag information based on the feature-selection values.

* * * * *